United States Patent
Moon et al.

(10) Patent No.: US 10,727,698 B2
(45) Date of Patent: Jul. 28, 2020

(54) APPARATUS FOR TRANSMMITING WIRELESS POWER AND APPARATUS FOR RECEIVING WIRELESS POWER

(71) Applicant: Electronics and Telecommunications Research Institute, Daejeon (KR)

(72) Inventors: Jung Ick Moon, Daejeon (KR); Sang-Won Kim, Daejeon (KR); Seong-Min Kim, Daejeon (KR); In Kui Cho, Daejeon (KR); Je Hoon Yun, Daejeon (KR); Dong Won Jang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 164 days.

(21) Appl. No.: 15/911,264

(22) Filed: Mar. 5, 2018

(65) Prior Publication Data

US 2019/0140482 A1  May 9, 2019

(30) Foreign Application Priority Data

Nov. 8, 2017  (KR) .......................... 10-2017-0148215

(51) Int. Cl.
*H02J 50/12* (2016.01)
*H02J 3/01* (2006.01)
(Continued)

(52) U.S. Cl.
CPC ................ *H02J 50/12* (2016.02); *H02J 3/01* (2013.01); *H02J 50/40* (2016.02); *H02J 7/025* (2013.01)

(58) Field of Classification Search
CPC .. H02J 50/10; H02J 50/12; H02J 50/40; H02J 3/01; H02J 7/025
(Continued)

(56) References Cited

U.S. PATENT DOCUMENTS

| 2011/0151820 A1 | 6/2011 | Kim |
| 2012/0019428 A1 | 1/2012 | Ju |
| 2014/0368294 A1 | 12/2014 | Ju |

FOREIGN PATENT DOCUMENTS

| KR | 10-1045585 | 6/2011 |
| KR | 10-1231853 | 2/2013 |

(Continued)

OTHER PUBLICATIONS

Kenneth Wyatt; "Harmonic Comb Generators Are Useful Tools", 2015 EMC Directory & Design Guide, Interference Technology, pp. 54-63.

*Primary Examiner* — Hal Kaplan
(74) *Attorney, Agent, or Firm* — Kile Park Reed & Houtteman PLLC

(57) ABSTRACT

Provided is a wireless power reception apparatus for wirelessly receiving power from a wireless power transmission apparatus, the wireless power reception apparatus including a reception coil configured to receive power by a harmonic with an n*f0 frequency that is generated through electromagnetic induction with the wireless power transmission apparatus; a matching circuit configured to transfer the harmonic with the n*f0 frequency to a harmonic generator; the harmonic generator configured to generate at least one harmonic with an m*n*f0 frequency by applying a multiplication factor m to the transferred harmonic with the n*f0 frequency; a filter configured to filter the harmonic with the m*n*f0 frequency; and a harmonic transmission coil configured to transmit the filtered harmonic with the m*n*f0 frequency to the wireless power transmission apparatus, and
(Continued)

to attenuate the harmonic with the n*f0 frequency that is generated from the wireless power transmission apparatus.

12 Claims, 4 Drawing Sheets

(51) Int. Cl.
*H02J 50/40* (2016.01)
*H02J 7/02* (2016.01)

(58) Field of Classification Search
USPC .......................................................... 307/104
See application file for complete search history.

(56) References Cited

FOREIGN PATENT DOCUMENTS

| | | |
|---|---|---|
| KR | 10-2015-0117072 | 10/2015 |
| KR | 10-2017-0088184 | 8/2017 |

APPARATUS FOR TRANSMMITING WIRELESS POWER AND APPARATUS FOR RECEIVING WIRELESS POWER

CROSS-REFERENCE TO RELATED APPLICATION(S)

This application claims the priority benefit of Korean Patent Application No. 10-2017-0148215 filed on Nov. 8, 2017, in the Korean Intellectual Property Office, the disclosure of which is incorporated herein by reference for all purposes.

BACKGROUND

1. Field

One or more example embodiments relate to a wireless power transmission apparatus and a wireless power reception apparatus, and more particularly, a wireless power transmission apparatus and a wireless power reception apparatus that may attenuate an unwanted harmonic occurring in the wireless power transmission apparatus.

2. Description of Related Art

Although electrical energy has been supplied in a wired manner, instead of using a wireless scheme in the art, a method of wirelessly supplying electrical energy without a contact between devices is currently used. A wireless power reception apparatus that wirelessly receives energy may operate with the received power or may charge a battery with the received power and may operate with the charged power.

A technique for wirelessly transmitting and receiving electrical energy is expanded to various fields associated with a smartphone, a wearable apparatus, a medical device, Internet of Things (IoT), and electric vehicle (EV) charging. However, emission of other electromagnetic waves in addition to electromagnetic waves desired to be transmitted may affect other neighboring electronic devices or a wireless power reception apparatus, or another portion of a device that includes the wireless power reception apparatus. Further, the other electronic waves may affect another electronic element and circuit in the wireless power transmission apparatus, thereby causing interference, malfunctions, damage, and the like.

SUMMARY

At least one example embodiment provides a wireless power transmission apparatus and a wireless power reception apparatus that may attenuate an unwanted harmonic through a harmonic generator configured to generate at least one harmonic and a harmonic transmission coil configured to adjust a phase of the harmonic.

At least one example embodiment also provides a wireless power transmission apparatus and a wireless power reception apparatus that may attenuate an unwanted harmonic through an isolator configured to control an electrical connection, a transmission and reception coil configured to simultaneously perform a harmonic reception and a harmonic transmission, and a harmonic generator configured to generate at least one harmonic.

At least one example embodiment also provides a wireless power transmission apparatus and a wireless power reception apparatus that may maintain the transmission efficiency of a wireless power transmission apparatus and may reduce electromagnetic interference of the wireless power transmission apparatus through a frequency mixer.

According to an aspect of at least one example embodiment, there is provided a wireless power reception apparatus for wirelessly receiving power from a wireless power transmission apparatus, the wireless power reception apparatus including a reception coil configured to receive power by a harmonic with an $n*f0$ frequency that is generated through electromagnetic induction with the wireless power transmission apparatus; a matching circuit configured to transfer the harmonic with the $n*f0$ frequency to a harmonic generator; the harmonic generator configured to generate at least one harmonic with an $m*n*f0$ frequency by applying a multiplication factor m to the transferred harmonic with the $n*f0$ frequency; a filter configured to filter the harmonic with the $m*n*f0$ frequency; and a harmonic transmission coil configured to transmit the filtered harmonic with the $m*n*f0$ frequency to the wireless power transmission apparatus, and to attenuate the harmonic with the $n*f0$ frequency that is generated from the wireless power transmission apparatus.

The harmonic transmission coil may be configured to invert a phase of the filtered harmonic with the $m*n*f0$ frequency and to transmit the phase-inverted harmonic to the wireless power transmission apparatus.

The multiplication factor m may be a positive integer or ½.

The harmonic with the $m*n*f0$ frequency may be filtered by the filter to selectively attenuate at least one harmonic with the $n*f0$ frequency that is generated from the wireless power transmission apparatus.

According to an aspect of at least one example embodiment, there is provided a wireless power transmission apparatus for wirelessly transmitting power to a wireless power reception apparatus, the wireless power transmission apparatus including a power source configured to generate power to be transmitted to the wireless power reception apparatus; a transmission circuit configured to transfer the power generated by the power source to a transmission coil; and the transmission coil configured to transmit the transferred power through electromagnetic induction with the wireless power reception apparatus. The transmission coil is configured to receive, from a harmonic transmission coil of the wireless power reception apparatus, a harmonic with an $m*n*f0$ frequency filtered to selectively attenuate an unwanted harmonic that is a harmonic with an $n*f0$ frequency. The filtered harmonic with the $m*n*f0$ frequency is generated by applying a multiplication factor m to the harmonic with the $n*f0$ frequency and passing through a filter.

The multiplication factor m may be a positive integer or ½.

According to an aspect of at least one example embodiment, there is provided a wireless power reception apparatus for wirelessly receiving power from a wireless power transmission apparatus, the wireless power reception apparatus including a transmission and reception coil configured to receive power by a harmonic with an $n*f0$ frequency that is generated through electromagnetic induction with the wireless power transmission apparatus, and to transmit a harmonic that is generated from the wireless power reception apparatus to the wireless power transmission apparatus; an isolator configured to adjust an electrical connection with the transmission and reception coil; a matching circuit configured to configured to transfer the harmonic with the $n*f0$ frequency transferred through the isolator to a harmonic generator; the harmonic generator configured to generate at least one harmonic with an m*n*f0 frequency by applying a multiplication factor m to the transferred harmonic with the n*f0 frequency; and a filter configured to filter the harmonic with the m*n*f0 frequency.

The filter may be configured to transfer the filtered harmonic with the m*n*f0 frequency to the isolator.

The transmission and reception coil may be configured to receive the filtered harmonic with the m*n*f0 frequency through the isolator, to invert a phase of the filtered harmonic with the m*n*f0 frequency and to transmit the phase-inverted harmonic to the wireless power transmission apparatus.

The multiplication factor m may be a positive integer or ½.

The harmonic with the m*n*f0 frequency may be filtered by the filter to selectively attenuate at least one harmonic with the n*f0 frequency that is generated from the wireless power transmission apparatus.

According to an aspect of at least one example embodiment, there is provided a wireless power transmission apparatus for wirelessly transmitting power to a wireless power reception apparatus, the wireless power transmission apparatus including a power source configured to generate power to be transmitted to the wireless power reception apparatus; a transmission circuit configured to transfer the power generated by the power source to a transmission coil; and the transmission coil configured to transmit the transferred power through electromagnetic induction with the wireless power reception apparatus. The transmission coil is configured to receive, from a transmission and reception coil of the wireless power reception apparatus, a harmonic with an m*n*f0 frequency filtered to selectively attenuate an unwanted harmonic that is a harmonic with an n*f0 frequency. The filtered harmonic with the m*n*f0 frequency is generated by applying a multiplication factor m to the harmonic with the n*f0 frequency and passing through a filter.

The multiplication factor m may be a positive integer or ½.

According to an aspect of at least one example embodiment, there is provided a wireless power reception apparatus for wirelessly receiving power from a wireless power transmission apparatus, the wireless power reception apparatus including a first reception apparatus configured to receive power by a harmonic with an n*f0 frequency from the wireless power transmission apparatus; a second reception apparatus configured to receive power by a harmonic with an (n+1)*f0 frequency from the wireless power transmission apparatus; a frequency mixer configured to mix frequencies of harmonics that are generated from the first reception apparatus and the second reception apparatus; and a harmonic transmission coil configured to transmit a harmonic generated by the frequency mixer to the wireless power transmission apparatus to reduce electromagnetic interference that occurs in the wireless power transmission apparatus.

The first reception apparatus may include a reception coil configured to receive power by the harmonic with the n*f0 frequency that is generated through electromagnetic induction with the wireless power transmission apparatus; a matching circuit configured to transfer the harmonic with the n*f0 frequency to a harmonic generator; the harmonic generator configured to generate at least one harmonic with an m*n*f0 frequency by applying a multiplication factor m to the transferred harmonic with the n*f0 frequency; and a filter configured to filter the harmonic with the m*n*f0 frequency.

The second reception apparatus may include a reception coil configured to receive power by a harmonic with an (n+1)*f0 frequency that is generated through electromagnetic induction with the wireless power transmission apparatus; a matching circuit configured to transfer the harmonic with the (n+1)*f0 frequency to a harmonic generator; the harmonic generator configured to generate at least one harmonic with an m*(n+1)*f0 frequency by applying a multiplication factor m to the transferred harmonic with the (n+1)*f0 frequency; and a filter configured to filter the harmonic with the m*(n+1)*f0 frequency.

The multiplication factor m may be a positive integer or ½.

The frequency mixer may be configured to generate a harmonic with a new frequency f1−f2 or f1+f2 by performing a subtraction or an addition on a frequency f1 of a harmonic filtered by the first reception apparatus and a frequency f2 of a harmonic filtered by the second reception apparatus.

The harmonic transmission coil may be configured to invert a phase of the harmonic with the new frequency and to transmit the phase-inverted harmonic to the wireless power transmission apparatus.

According to an aspect of at least one example embodiment, there is provided a wireless power transmission apparatus for wirelessly transmitting power to a wireless power reception apparatus, the wireless power transmission apparatus including a power source configured to generate power to be transmitted to the wireless power reception apparatus; a transmission circuit configured to transfer the power generated by the power source to a transmission coil; and the transmission coil to transmit the transferred power through electromagnetic induction with the wireless power reception apparatus. To reduce electromagnetic interference occurring by a harmonic with an f0 frequency, the transmission coil is configured to generate a harmonic with a new frequency through a frequency mixer of the wireless power reception apparatus, to invert a phase of the generated harmonic, and to transmit the phase-inverted harmonic to the transmission coil through a harmonic transmission coil.

According to example embodiments, there may be provided a wireless power transmission apparatus and a wireless power reception apparatus that may attenuate an unwanted harmonic through a harmonic generator configured to generate at least one harmonic and a harmonic transmission coil configured to adjust a phase of the harmonic.

Also, according to example embodiments, there may be provided a wireless power transmission apparatus and a wireless power reception apparatus that may attenuate an unwanted harmonic through an isolator configured to control an electrical connection, a transmission and reception coil configured to simultaneously perform a harmonic reception and a harmonic transmission, and a harmonic generator configured to generate at least one harmonic.

Also, according to example embodiments, there may be provided a wireless power transmission apparatus and a wireless power reception apparatus that may maintain the transmission efficiency of a wireless power transmission apparatus and may reduce electromagnetic interference of the wireless power transmission apparatus through a frequency mixer.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
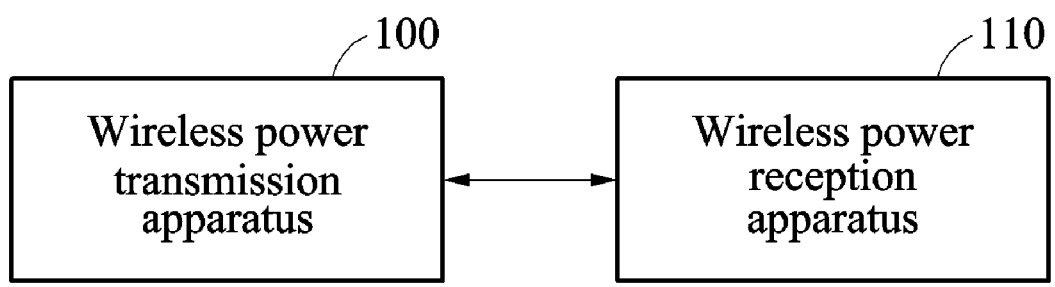
FIG. 1 is a diagram illustrating a wireless power transmission apparatus and a wireless power reception apparatus according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

The following detailed structural or functional description of example embodiments is provided as an example only and various alterations and modifications may be made to the example embodiments. Accordingly, the example embodiments are not construed as being limited to the disclosure and should be understood to include all changes, equivalents, and replacements within the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component. On the contrary, it should be noted that if it is described that one component is "directly connected", "directly coupled", or "directly joined" to another component, a third component may be absent. Expressions describing a relationship between components, for example, "between", directly between", or "directly neighboring", etc., should be interpreted to be alike.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, the example embodiments are described with reference to the accompanying drawings.

FIG. 1 is a diagram illustrating a wireless power transmission apparatus and a wireless power reception apparatus according to an example embodiment.

Referring to FIG. 1, power or energy may be wirelessly transmitted and received between a wireless power transmission apparatus 100 and a wireless power reception apparatus 110. Here, the power or the energy may be wirelessly transmitted and received through electromagnetic induction, that is, electromagnetic coupling or self-resonance between a transmission coil of the wireless power transmission apparatus 100 and a reception coil of the wireless power reception apparatus 110.

Here, the wireless power transmission and reception by the electromagnetic induction indicates transmitting and receiving power or energy by inducing current from a single coil to another coil through an electromagnetic field varying in the coil by the electromagnetic induction. The wireless power transmission and reception by the self-resonance indicates transmitting and receiving the power or the energy through a resonance occurring between the wireless power transmission apparatus 100 and the wireless power reception apparatus 110.

According to an example embodiment, the wireless power transmission apparatus 100 may charge a battery of the wireless power reception apparatus 110 by wirelessly transmitting the power to the wireless power reception apparatus 110. Also, the wireless power reception apparatus 110 refers to a device that may operate by wirelessly receiving the power from the wireless power transmission apparatus 100, and may charge the battery using the received power.

The wireless power reception apparatus 110, as a device that wirelessly receives the power or the energy, may include, for example, a portable electronic device, a keyboard, a mouse, an auxiliary output device of a video and an audio, a mobile communication terminal such as a mobile phone, a cellular phone, etc., a smartphone, a personal digital assistant (PDA), a portable multimedia player (PMP), a tablet, and a multimedia device.

According to an example embodiment, it is possible to attenuate an unwanted harmonic of the wireless power transmission apparatus 100. Also, when the wireless power transmission apparatus 100 transmits high output energy, it is possible to reduce interference between the wireless power transmission apparatus 100 and neighboring electrical and electronic devices, and the influence against a human body.

Figure 2:
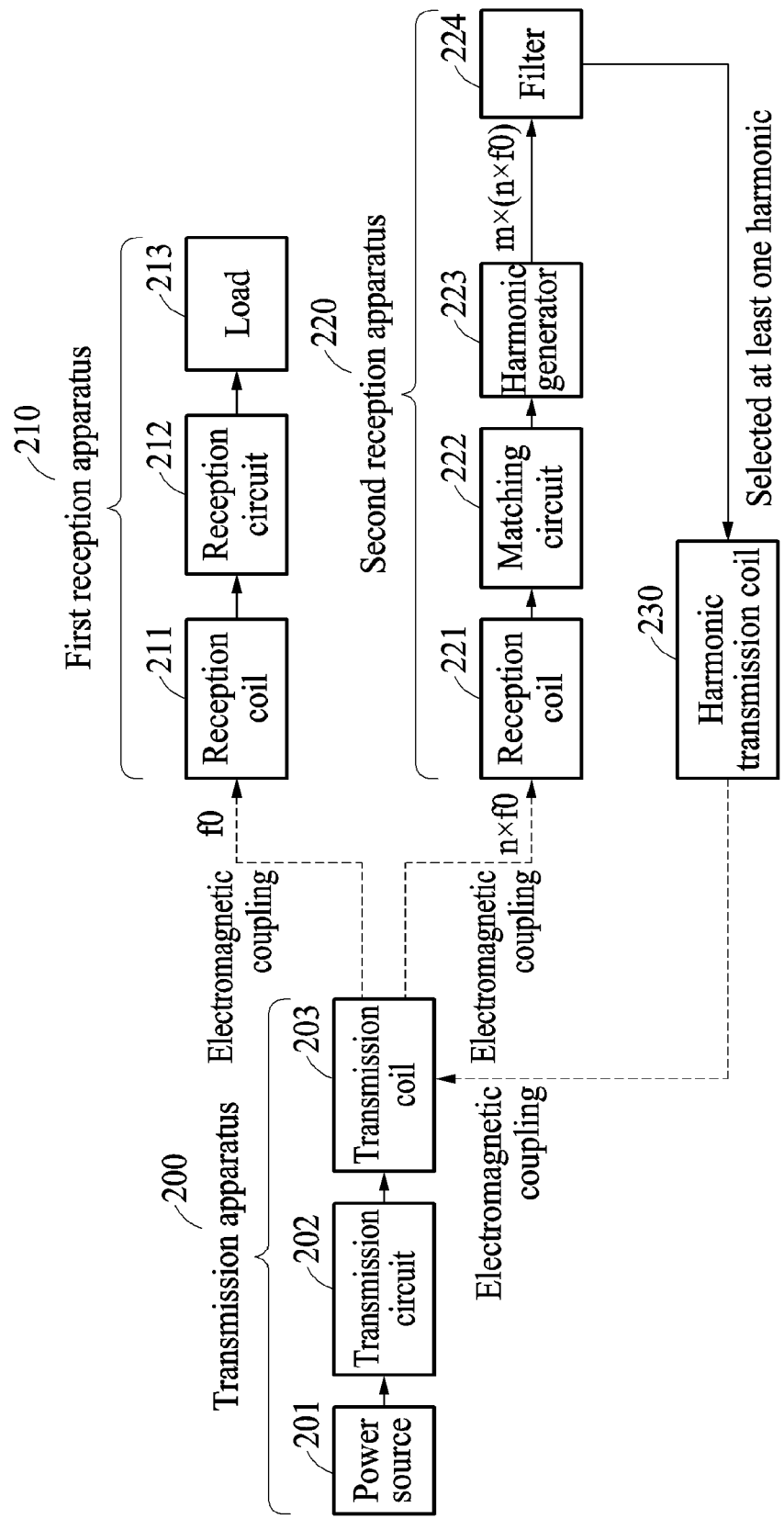
FIG. 2 is a diagram illustrating a wireless power transmission and reception system to attenuate an unwanted harmonic using a harmonic generator, a filter, and a harmonic transmission coil according to an example embodiment.

FIG. 2 is a diagram illustrating a wireless power transmission and reception system to attenuate an unwanted harmonic using a harmonic generator, a filter, and a harmonic transmission coil according to an example embodiment.

Referring to FIG. 2, the wireless power transmission and reception system may include a wireless power transmission apparatus and a wireless power reception apparatus. The wireless power transmission apparatus may be a transmission apparatus 200 that includes at least one of a power source 201, a transmission circuit 202, and a transmission coil 203. The wireless power reception apparatus may include at least one of a first reception apparatus 210, a second reception apparatus 220, and a harmonic transmission coil 230.

The power or the energy generated from the transmission apparatus 200 may be transmitted to the first reception apparatus 210 or the second reception apparatus 220 through electromagnetic induction or self-resonance. Here, the power or the energy transmitted to the first reception apparatus 210 may be power or energy by a base frequency $f0$ that is generated from the transmission apparatus 200. Also, the power or the energy transmitted to the second reception apparatus 220 may be power or energy by an $n*f0$ frequency that is generated from the transmission apparatus 200.

The wireless power reception apparatus may receive the power or the energy by the $n*f0$ frequency through the second reception apparatus 220, in addition to the power or the energy by the $f0$ frequency to be transmitted to the first reception apparatus 210.

According to an example embodiment, the first reception apparatus 210 may receive the power or the energy by the $f0$ frequency using a reception coil 211. The received power or energy may be transmitted to a load 213 through a reception circuit 212.

Here, the reception circuit 212 may include a rectifier and a regulator. The power or the energy through the reception circuit 212 may be converted to direct current (DC). The power converted to the DC may be transmitted to the load 213. The load 213 may use the transmitted power or energy.

According to an example embodiment, the second reception apparatus 220 may receive power or energy by the $n*f0$ frequency using a reception coil 221. Here, n denotes an integer, for example, an integer of 2 or more. If n=1, the second reception apparatus 220 may perform the same function as the first reception apparatus 210. The energy transmitted from the transmission coil 203 to the first reception apparatus 210 may decrease.

The received power or energy may be impedance-matched at a matching circuit 222 and then input to a harmonic generator 223. Accordingly, the received power or energy may be transmitted to the harmonic generator 223 through the matching circuit 222. Here, the harmonic generator 223 may generate at least one harmonic with an $m*n*f0$ frequency by applying a multiplication factor m to a received harmonic with the $n*f0$ frequency. For example, if the harmonic generator 223 applies the multiplication factor m to a received harmonic with a $3*f0$ frequency, it may indicate a harmonic with a $1*3*f0$ frequency, a harmonic with a $2*3*f0$ frequency, a harmonic with a $3*3*f0$ frequency, and the like. Accordingly, the harmonic generator 223 that receives the harmonic with the $n*f0$ frequency may generate a plurality of harmonics through the multiplication factor m.

Here, the multiplication factor m may be a positive integer or ½. For example, the $m*n*f0$ frequency may represent a ½$*n*f0$ frequency, a $1*n*f0$ frequency, a $2*n*f0$ frequency, $3*n*f0$ frequency, and the like. Accordingly, the harmonic generator 223 may generate the harmonic with the $m*n*f0$ frequency by multiplying the harmonic with the $n*f0$ frequency.

According to an example embodiment, at least one harmonic with the $m*n*f0$ frequency generated by the harmonic generator 223 may be transmitted to and filtered by a filter 224. Here, to attenuate an unwanted harmonic of the transmission apparatus 200, the filter 224 may select a portion of at least one harmonic with the $m*n*f0$ frequency through filtering. The filter 224 may include a band pass filter and a band stop filter. It is provided as an example only. If necessary, the filter 224 may further include another filter.

Here, at least one harmonic may be selected and the selected at least one harmonic may be used to attenuate at least one unwanted harmonic through electromagnetic induction or self-resonance with the transmission apparatus 200 using the harmonic transmission coil 230.

According to an example embodiment, the harmonic transmission coil 230 may adjust a phase of at least one harmonic filtered through the filter 224 among the one or more harmonics with the $m*n*f0$ frequency, and may cause the electromagnetic induction of the transmission apparatus 200 with the phase-adjusted harmonic. The transmission apparatus 200 may attenuate at least one unwanted harmonic. Here, in the case of adjusting a phase of a harmonic, the harmonic transmission coil 230 may 180 degrees invert the phase of the harmonic.

Accordingly, it is possible to attenuate the unwanted harmonic of the transmission apparatus 200. Also, when the transmission apparatus 200 transmits high output energy, it is possible to reduce interference with electrical and electronic devices present around the transmission apparatus 200 and the influence against a human body.

Figure 3:
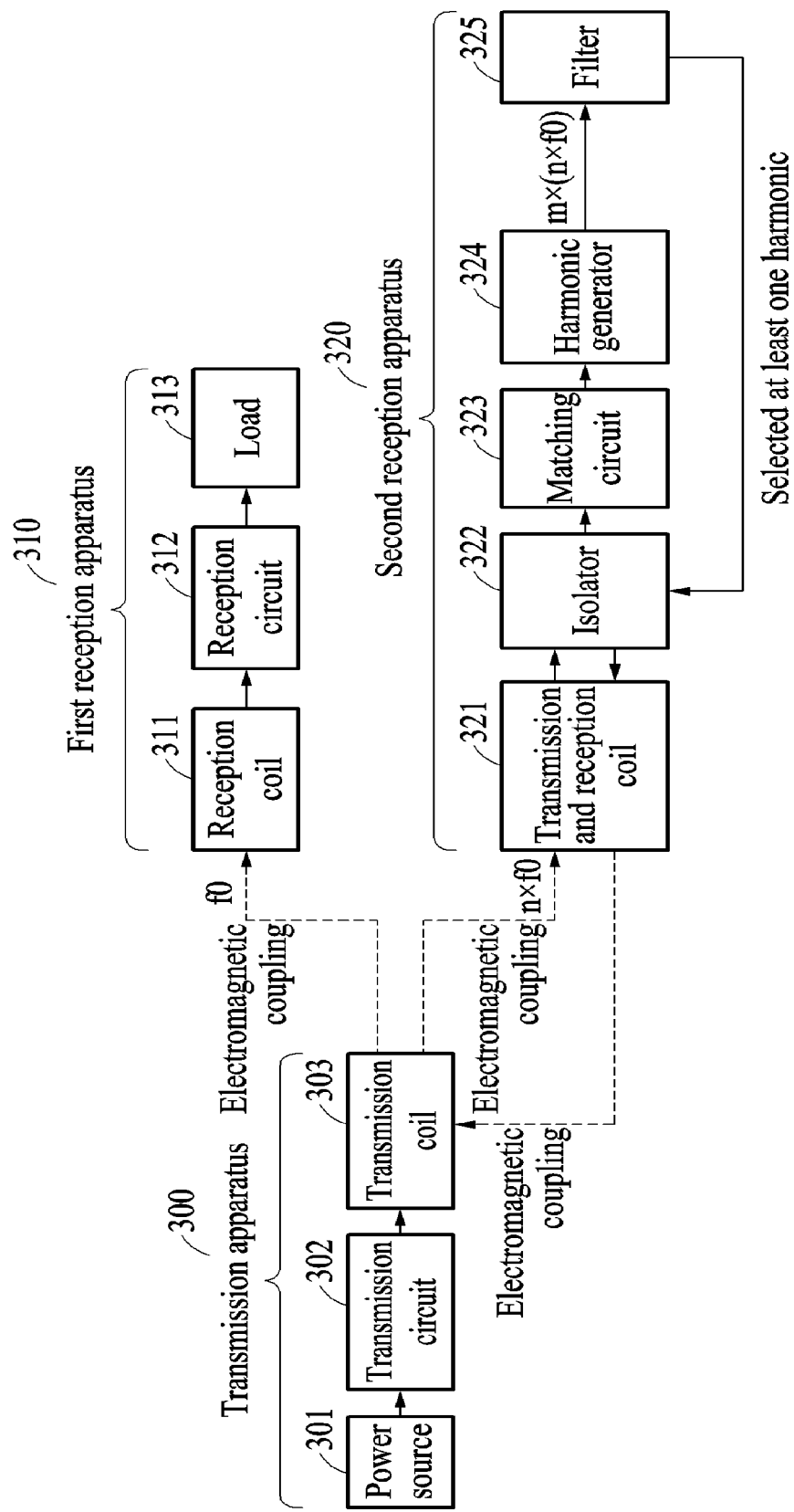
FIG. 3 is a diagram illustrating a wireless power transmission and reception system to attenuate an unwanted harmonic using a harmonic generator, a filter, an isolator, and a transmission and reception coil according to an example embodiment.

FIG. 3 is a diagram illustrating a wireless power transmission and reception system to attenuate an unwanted harmonic using a harmonic generator, a filter, an isolator, and a transmission and reception coil according to an example embodiment.

Referring to FIG. 3, the wireless power transmission and reception system may include a wireless power transmission apparatus and a wireless power reception apparatus. The wireless power transmission apparatus may be a transmission apparatus 300 that includes at least one of a power source 301, a transmission circuit 302, and a transmission coil 303. The wireless power reception apparatus may include at least one of a first reception apparatus 310, a second reception apparatus 320, an isolator 322, and a transmission and reception coil 321.

Power or energy generated from the transmission apparatus 300 may be transmitted to the first reception apparatus 310 or the second reception apparatus 320 through electromagnetic induction or self-resonance. Here, the power or the energy transmitted to the first reception apparatus 310 may be power or energy by a base frequency $f0$ that is generated from the transmission apparatus 300. Also, the power or the energy transmitted to the second reception apparatus 320 may be power or energy by an $n*f0$ frequency that is generated from the transmission apparatus 300.

The wireless power reception apparatus may receive the power or the energy by the $n*f0$ frequency through the second reception apparatus 320 in addition to the power or the energy by the $f0$ frequency transmitted to the first reception apparatus 310.

According to an example embodiment, the first reception apparatus 310 may receive the power or the energy by the $f0$ frequency using a reception coil 311. The received power or energy may be transmitted to a load 313 through a reception circuit 312.

Here, the reception circuit 312 may include a rectifier and a regulator. The power or the energy through the reception circuit 312 may be converted to DC. The power converted to the DC may be transmitted to the load 313. The load 313 may use the transmitted power or energy.

According to an example embodiment, the second reception apparatus 320 may receive power or energy by the n*f0 frequency using the transmission and reception coil 321. Here, n denotes an integer, for example, an integer of 2 or more.

Here, the transmission and reception coil 321 may receive a harmonic with the n*f0 frequency through electromagnetic induction with the transmission coil 303. Also, the transmission and reception coil 321 may transmit a harmonic filtered through a filter 325 among one or more harmonics with the m*n*f0 frequency generated through a harmonic generator 324 and received through the isolator 322, and may cause the electromagnetic induction with the transmission apparatus 300. Accordingly, the transmission and reception coil 321 may cause the electromagnetic induction with the transmission coil 303 by receiving the harmonic through the electromagnetic induction with the transmission coil 303 or by transmitting the harmonic generated from the second reception apparatus 320.

The isolator 322, also referred to as a circulator, may be a device that adjusts an electrical connection. For example, the isolator 322 may perform an electrical connection to transmit the harmonic with the n*f0 frequency from the transmission and reception coil 321 to a matching circuit 323. Also, the isolator 322 may control the electrical connection to transmit the harmonic filtered through the filter 325 to the transmission and reception coil 321.

The power or the energy received through the isolator 322 may be impedance-matched at the matching circuit 323 and then transmitted to the harmonic generator 324. Here, the harmonic generator 324 may generate at least one harmonic with the m*n*f0 frequency by applying a multiplication factor m to the received harmonic with the n*f0 frequency. For example, if the harmonic generator 324 applies the multiplication factor m to a received harmonic with a 3*f0 frequency, it may indicate a harmonic with a 1*3*f0 frequency, a harmonic with a 2*3*f0 frequency, a harmonic with a 3*3*f0 frequency, and the like. Accordingly, the harmonic generator 324 that receives the harmonic with the n*f0 frequency may generate a plurality of harmonics through the multiplication factor m.

Here, the multiplication factor m may be a positive integer or ½. For example, the m*n*f0 frequency may represent a ½*n*f0 frequency, a 1*n*f0 frequency, a 2*n*f0 frequency, 3*n*f0 frequency, and the like. Accordingly, the harmonic generator 324 may generate the harmonic with the m*n*f0 frequency by multiplying the harmonic with the n*f0 frequency.

According to an example embodiment, at least one harmonic with the m*n*f0 frequency generated by the harmonic generator 324 may be transmitted to and filtered by the filter 325. Here, to attenuate an unwanted harmonic of the transmission apparatus 300, the filter 325 may select a portion of the at least one harmonic with the m*n*f0 frequency through filtering. The filter 325 may include a band pass filter and a band stop filter. It is provided as an example only. If necessary, the filter 325 may further include another filter.

Here, at least one harmonic may be selected and the selected at least one harmonic may be used to attenuate at least one unwanted harmonic through electromagnetic induction or self-resonance with the transmission apparatus 300 using the transmission and reception coil 321.

According to an example embodiment, the transmission and reception coil 321 may adjust a phase of at least one harmonic filtered through the filter 325 among the one or more harmonics with the m*n*f0 frequency, and may cause the electromagnetic induction of the transmission apparatus 300 with the adjusted harmonic. The transmission apparatus 300 may attenuate at least one unwanted harmonic. Here, in the case of adjusting a phase of a harmonic, the transmission and reception coil 321 may invert the phase of the harmonic.

According to an example embodiment, it is possible to attenuate the unwanted harmonic of the transmission apparatus 300. Also, when the transmission apparatus 300 transmits high output energy, it is possible to reduce interference with electrical and electronic devices present around the transmission apparatus 300 and the influence against a human body.

Figure 4:
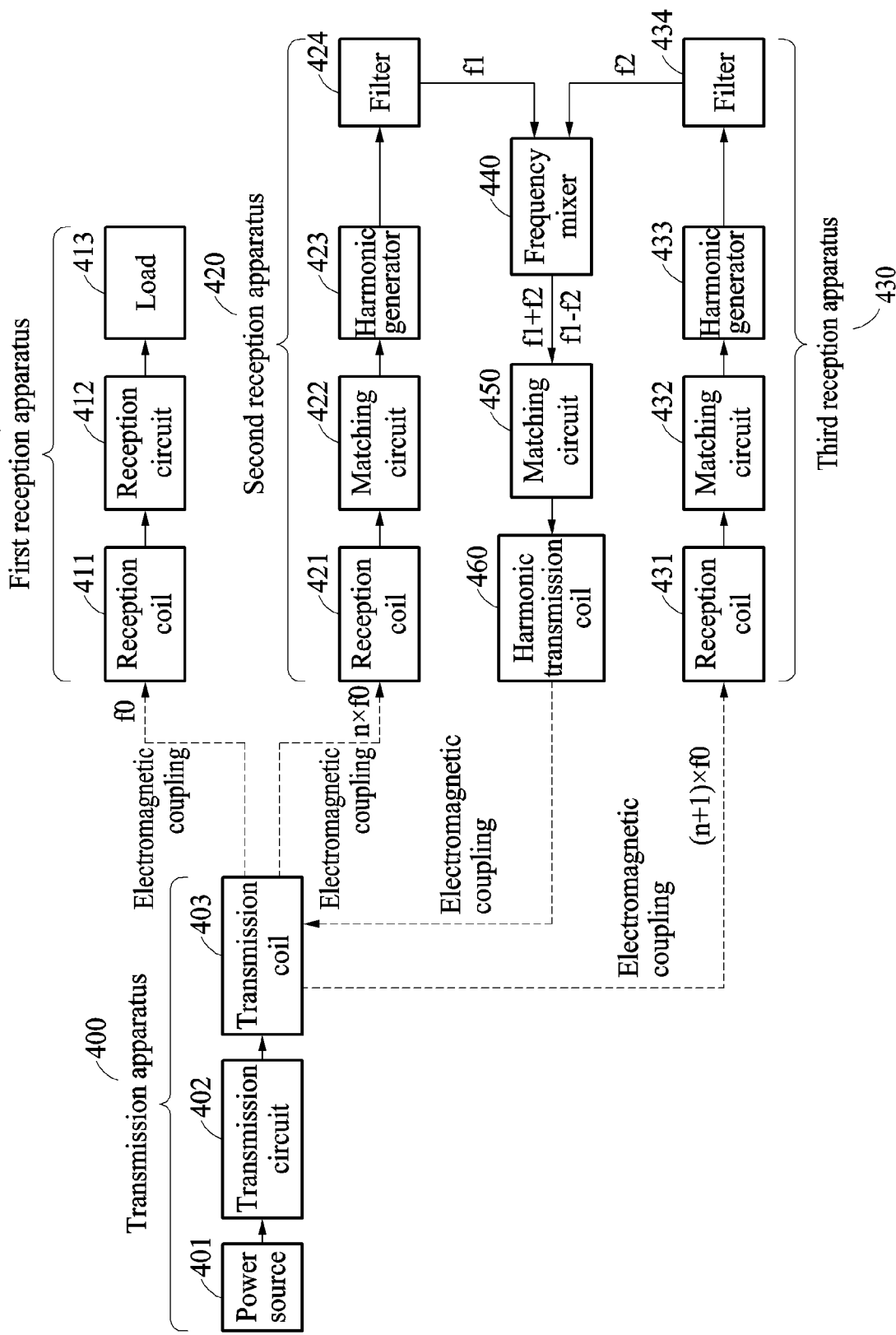
FIG. 4 is a diagram illustrating a wireless power transmission and reception system to attenuate an unwanted harmonic using a harmonic generator, a filter, a frequency mixer, and a harmonic transmission coil according to an example embodiment.

FIG. 4 is a diagram illustrating a wireless power transmission and reception system to attenuate an unwanted harmonic using a harmonic generator, a filter, a frequency mixer, and a harmonic transmission coil according to an example embodiment.

Referring to FIG. 4, the wireless power transmission and reception system may include a wireless power transmission apparatus and a wireless power reception apparatus. The wireless power transmission apparatus may be a transmission apparatus 400 that includes at least one of a power source 401, a transmission circuit 402, and a transmission coil 403. The wireless power reception apparatus may include at least one of a first reception apparatus 410, a second reception apparatus 420, a third reception apparatus 430, a frequency mixer 440, a matching circuit 450, and a harmonic transmission coil 460.

Power or energy generated from the transmission apparatus 400 may be transmitted to the first reception apparatus 410, the second reception apparatus 420, or the third reception apparatus 430 through electromagnetic induction or self-resonance. Here, the power or the energy transmitted to the first reception apparatus 410 may be power or energy by a base frequency f0 that is generated from the transmission apparatus 400. Also, the power or the energy transmitted to the second reception apparatus 420 may be power or energy by an n*f0 frequency that is generated from the transmission apparatus 400. Also, the power or the energy transmitted to the third reception apparatus 430 may be power or energy by an (n+1)*f0 frequency that is generated from the transmission apparatus 400. Here, n denotes an integer, for example, an integer of 2 or more.

The wireless power reception apparatus may receive the power or energy by the n*f0 frequency through the second reception apparatus 420 in addition to the power or the energy by the f0 frequency transmitted to the first reception apparatus 410, and may receive the power or energy by the (n+1)*f0 frequency through the third reception apparatus 430.

According to an example embodiment, the first reception apparatus 410 may receive the power or the energy by the f0 frequency using a reception coil 411. The received power or energy may be transmitted to a load 413 through a reception circuit 412.

Here, the reception circuit 412 may include a rectifier and a regulator. The power or the energy through the reception circuit 412 may be converted to DC. The power converted to the DC may be transmitted to the load 413. The load 413 may use the transmitted power or energy.

According to an example embodiment, the second reception apparatus 420 may receive power or energy by the n*f0 frequency using the reception coil 421. Here, n denotes an integer, for example, an integer of 2 or more.

The received power or energy may be transmitted to a harmonic generator 423 through a matching circuit 422. Here, the harmonic generator 423 may generate at least one harmonic with an m*n*f0 frequency by applying a multiplication factor m to the received harmonic with the n*f0 frequency. For example, if the harmonic generator 423 applies the multiplication factor m to a received harmonic with a 3*f0 frequency, it may indicate a harmonic with a 1*3*f0 frequency, a harmonic with a 2*3*f0 frequency, a harmonic with a 3*3*f0 frequency, and the like. Accordingly, the harmonic generator 423 that receives the harmonic with the n*f0 frequency may generate a plurality of harmonics through the multiplication factor m.

Here, the multiplication factor m may be a positive integer or ½. For example, the m*n*f0 frequency may represent a ½*n*f0 frequency, a 1*n*f0 frequency, a 2*n*f0 frequency, 3*n*f0 frequency, and the like. Accordingly, the harmonic generator 423 may generate the harmonic with the m*n*f0 frequency by multiplying the harmonic with the n*f0 frequency.

According to an example embodiment, at least one harmonic with the m*n*f0 frequency generated by the harmonic generator 423 may be transmitted to and filtered by a filter 424. Here, to attenuate an unwanted harmonic of the transmission apparatus 400, the filter 424 may select a portion of the at least one harmonic with the m*n*f0 frequency through filtering. The filter 424 may include a band pass filter and a band stop filter. It is provided as an example only. If necessary, the filter 424 may further include another filter.

According to another example embodiment, the third reception apparatus 430 may receive power or energy by the (n+1)*f0 frequency using a reception coil 431. Here, n denotes an integer including 1.

The received power or energy may be transmitted to a harmonic generator 433 through a matching circuit 432. Here, the harmonic generator 433 may generate at least one harmonic with an m*(n+1)*f0 frequency by applying the multiplication factor m to the received harmonic with the (n+1)*f0 frequency. For example, if the harmonic generator 433 applies the multiplication factor m to a received harmonic with a 3*f0 frequency, it may indicate a harmonic with a 1*3*f0 frequency, a harmonic with a 2*3*f0 frequency, a harmonic with a 3*3*f0 frequency, and the like. Accordingly, the harmonic generator 423 that receives the harmonic with the (n+1)*f0 frequency may generate a plurality of harmonics through the multiplication factor m.

Here, the multiplication factor m may be a positive integer or ½. For example, the m*(n+1)*f0 frequency may represent a ½*n*f0 frequency, a 1*n*f0 frequency, a 2*n*f0 frequency, 3*n*f0 frequency, and the like. Accordingly, the harmonic generator 433 may generate the harmonic with the m*(n+1)*f0 frequency by multiplying the harmonic with the (n+1)*f0 frequency.

According to an example embodiment, at least one harmonic with the m*(n+1)*f0 frequency generated by the harmonic generator 433 may be transmitted to and filtered by a filter 434. Here, to attenuate an unwanted harmonic of the transmission apparatus 400, the filter 434 may select a portion of at least one harmonic with the m*(n+1)*f0 frequency through filtering.

According to an example embodiment, a harmonic with an f1 frequency filtered through the filter 424 of the second reception apparatus 420 and a harmonic with an f2 frequency filtered through the filter 434 of the third reception apparatus 430 may be input to the frequency mixer 440. The frequency mixer 440 may generate a harmonic with an (f1+f2) frequency, an (f1−f2) frequency, or an (f2−f1) frequency by mixing the f1 frequency and the f2 frequency.

For example, the second reception apparatus 420 may receive a harmonic with a 2f0 frequency and the third reception apparatus 430 may receive a harmonic with a 3f0 frequency. If m=2, the second reception apparatus 420 may output a harmonic with a 2*2f0 frequency through filtering. If m=2, the third reception apparatus 430 may output a harmonic with a 2*3f0 frequency through filtering. Accordingly, the frequency mixer 440 may generate a harmonic with a 2*3f0−2*2f0=2*f0 frequency.

As another example, in the case of generating a harmonic with an f0 frequency through the frequency mixer 440, the same function as the first reception apparatus 410 may be performed, and energy transmitted from the transmission coil 403 to the first reception apparatus 410 may decrease.

As another example, in addition to harmonics with 2f0, 3f0, 4f0 frequencies, harmonics with 1.5f0, 2.5f0, and 3.5f0 frequencies may be generated through the frequency mixer 440.

The generated harmonic with the frequency may be transmitted to the harmonic transmission coil 460 through the matching circuit 450. The harmonic transmission coil 460 that receives the harmonic may reduce electromagnetic wave interference of the f0 frequency occurring in the transmission apparatus 400 through electromagnetic induction or self-resonance with the transmission coil 403.

According to an example embodiment, the harmonic transmission coil 460 may adjust a phase of the generated harmonic with the (f1+f2) frequency, the (f1−f2) frequency, or the (f2−f1) frequency, and may cause the electromagnetic induction of the transmission apparatus 400 with the phase-adjusted harmonic. Accordingly, the transmission apparatus 400 may attenuate at least one unwanted harmonic. Here, in the case of adjusting a phase of a harmonic the harmonic transmission coil 460 may invert the phase of the harmonic.

Accordingly, the wireless power reception apparatus may maintain the transmission efficiency of the wireless power transmission apparatus and may reduce electromagnetic interference occurring in the wireless power transmission apparatus through the frequency mixer 440.

The units and/or modules described herein may be implemented using hardware components, software components, and/or combination thereof. For example, the hardware components may include microphones, amplifiers, bandpass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include plurality of processing elements and plurality of types of processing elements. For example, a processing device may include plurality of processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

The components described in the example embodiments may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the example embodiments may be achieved by software, and the software may be recorded on a recording medium. The components, the functions, and the processes described in the example embodiments may be achieved by a combination of hardware and software.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A wireless power reception apparatus for wirelessly receiving power from a wireless power transmission apparatus, the wireless power reception apparatus comprising:
    a reception coil configured to receive power by a harmonic with an $n*f0$ frequency that is generated through electromagnetic induction with the wireless power transmission apparatus;
    a matching circuit configured to transfer the harmonic with the $n*f0$ frequency to a harmonic generator;
    the harmonic generator configured to generate at least one harmonic with an $m*n*f0$ frequency by applying a multiplication factor m to the transferred harmonic with the $n*f0$ frequency;
    a filter configured to filter the harmonic with the $m*n*f0$ frequency; and
    a harmonic transmission coil configured to transmit the filtered harmonic with the $m*n*f0$ frequency to the wireless power transmission apparatus, and to attenuate the harmonic with the $n*f0$ frequency that is generated from the wireless power transmission apparatus,
    wherein the multiplication factor m is positive integer or ½, the n is an integer and the f0 is a base frequency generated from the wireless power transmission apparatus.

2. The wireless power reception apparatus of claim 1, wherein the harmonic transmission coil is configured to invert a phase of the filtered harmonic with the $m*n*f0$ frequency and to transmit the phase-inverted harmonic to the wireless power transmission apparatus.

3. The wireless power reception apparatus of claim 1, wherein the harmonic with the $m*n*f0$ frequency is filtered by the filter to selectively attenuate at least one harmonic with the $n*f0$ frequency that is generated from the wireless power transmission apparatus.

4. A wireless power reception apparatus for wirelessly receiving power from a wireless power transmission apparatus, the wireless power reception apparatus comprising:
    a transmission and reception coil configured to receive power by a harmonic with an $n*f0$ frequency that is generated through electromagnetic induction with the wireless power transmission apparatus, and to transmit a harmonic that is generated from the wireless power reception apparatus to the wireless power transmission apparatus;
    an isolator configured to adjust an electrical connection with the transmission and reception coil;
    a matching circuit configured to transfer the harmonic with the $n*f0$ frequency transferred through the isolator to a harmonic generator;
    the harmonic generator configured to generate at least one harmonic with an $m*n*f0$ frequency by applying a multiplication factor m to the transferred harmonic with the $n*f0$ frequency; and
    a filter configured to filter the harmonic with the $m*n*f0$ frequency,
    wherein the multiplication factor m is positive integer or ½, the n is an integer and the f0 is a base frequency generated from the wireless power transmission apparatus.

5. The wireless power reception apparatus of claim 4, wherein the filter is configured to transfer the filtered harmonic with the $m*n*f0$ frequency to the isolator.

6. The wireless power reception apparatus of claim 4, wherein the transmission and reception coil is configured to receive the filtered harmonic with the m*n*f0 frequency through the isolator, to invert a phase of the filtered harmonic with the m*n*f0 frequency, and to transmit the phase-inverted harmonic to the wireless power transmission apparatus.

7. The wireless power reception apparatus of claim 4, wherein the harmonic with the m*n*f0 frequency is filtered by the filter to selectively attenuate at least one harmonic with the n*f0 frequency that is generated from the wireless power transmission apparatus.

8. A wireless power reception apparatus for wirelessly receiving power from a wireless power transmission apparatus, the wireless power reception apparatus comprising:
   a first reception apparatus configured to receive power by a harmonic with an n*f0 frequency from the wireless power transmission apparatus;
   a second reception apparatus configured to receive power by a harmonic with an (n+1)*f0 frequency from the wireless power transmission apparatus;
   a frequency mixer configured to mix frequencies of harmonics that are generated from the first reception apparatus and the second reception apparatus; and
   a harmonic transmission coil configured to transmit a harmonic generated by the frequency mixer to the wireless power transmission apparatus to reduce electromagnetic interference that occurs in the wireless power transmission apparatus,
   wherein the multiplication factor m is positive integer or ½, the n is an integer and the f0 is a base frequency generated from the wireless power transmission apparatus.

9. The wireless power reception apparatus of claim 8, wherein the first reception apparatus comprises:
   a reception coil configured to receive power by the harmonic with the n*f0 frequency that is generated through electromagnetic induction with the wireless power transmission apparatus;
   a matching circuit configured to transfer the harmonic with the n*f0 frequency to a harmonic generator;
   the harmonic generator configured to generate at least one harmonic with an m*n*f0 frequency by applying a multiplication factor m to the transferred harmonic with the n*f0 frequency; and
   a filter configured to filter the harmonic with the m*n*f0 frequency.

10. The wireless power reception apparatus of claim 8, wherein the second reception apparatus comprises:
    a reception coil configured to receive power by a harmonic with an (n+1)*f0 frequency that is generated through electromagnetic induction with the wireless power transmission apparatus;
    a matching circuit configured to transfer the harmonic with the (n+1)*f0 frequency to a harmonic generator;
    the harmonic generator configured to generate at least one harmonic with an m*(n+1)*f0 frequency by applying a multiplication factor m to the transferred harmonic with the (n+1)*f0 frequency; and
    a filter configured to filter the harmonic with the m*(n+1)*f0 frequency.

11. The wireless power reception apparatus of claim 8, wherein the frequency mixer is configured to generate a harmonic with a new frequency f1−f2 or f1+f2 by performing a subtraction or an addition on a frequency f1 of a harmonic filtered by the first reception apparatus and a frequency f2 of a harmonic filtered by the second reception apparatus.

12. The wireless power reception apparatus of claim 11, wherein the harmonic transmission coil is configured to invert a phase of the harmonic with the new frequency and to transmit the phase-inverted harmonic to the wireless power transmission apparatus.

\* \* \* \* \*